(12) United States Patent
Pierson et al.

(10) Patent No.: US 11,961,383 B2
(45) Date of Patent: *Apr. 16, 2024

(54) SYSTEMS AND METHODS FOR ACTUATOR INSTALLATION AUTO-VERIFICATION

(71) Applicant: Johnson Controls Tyco IP Holdings LLP, Milwaukee, MI (US)

(72) Inventors: John T. Pierson, Whitefish Bay, WI (US); John K. Krenzer, St. Francis, WI (US); Aaron D. Wagner, Menomonee Falls, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/331,236

(22) Filed: May 26, 2021

(65) Prior Publication Data

US 2021/0280041 A1 Sep. 9, 2021

Related U.S. Application Data

(63) Continuation of application No. 15/968,710, filed on May 1, 2018, now Pat. No. 11,024,148.

(Continued)

(51) Int. Cl.
*G05B 15/02* (2006.01)
*F24F 11/38* (2018.01)
(Continued)

(52) U.S. Cl.
CPC ............ *G08B 21/187* (2013.01); *F24F 11/38* (2018.01); *F24F 11/52* (2018.01); *F24F 11/72* (2018.01);
(Continued)

(58) Field of Classification Search
CPC .. F24F 11/38; F24F 11/52; F24F 11/58; F24F 11/72; F24F 2110/10; F24F 2110/12;
(Continued)

(56) References Cited

U.S. PATENT DOCUMENTS

2005/0155365 A1 7/2005 Shah et al.
2015/0204568 A1 7/2015 Thomas et al.
(Continued)

OTHER PUBLICATIONS

Yu, Y. et al., "A Review of Fault Detection and Diagnosis Methodologies on Air-Handling Units", Energy and Buildings, 2014, 82, pp. 550-562.

*Primary Examiner* — Yuhui R Pan
(74) *Attorney, Agent, or Firm* — Foley & Lardner LLP

(57) ABSTRACT

An actuator in an HVAC system is provided. The actuator includes a motor and a drive device. The drive device is driven by the motor and coupled to an HVAC component for driving the HVAC component between multiple positions. The actuator further includes a processing circuit. The processing circuit is coupled to the motor and configured to transmit control signals to operate the motor to drive the HVAC component between a first position and a second position, monitor temperature data received from one or more temperature sensors, determine that the temperature data does not meet an expected performance criterion and transmit an alarm signal.

20 Claims, 6 Drawing Sheets

Related U.S. Application Data

(60) Provisional application No. 62/500,353, filed on May 2, 2017.

(51) Int. Cl.
    *F24F 11/52*     (2018.01)
    *F24F 11/72*     (2018.01)
    *G08B 21/18*     (2006.01)
    *F24F 11/58*     (2018.01)
    *F24F 110/10*     (2018.01)
    *F24F 110/12*     (2018.01)
    *H04L 67/12*     (2022.01)

(52) U.S. Cl.
    CPC ........... *F24F 11/58* (2018.01); *F24F 2110/10* (2018.01); *F24F 2110/12* (2018.01); *G05B 15/02* (2013.01); *G05B 2219/2642* (2013.01); *H04L 67/12* (2013.01)

(58) Field of Classification Search
    CPC . G05B 15/02; G05B 2219/2642; H04L 67/12; G08B 21/187
    See application file for complete search history.

(56) References Cited

U.S. PATENT DOCUMENTS

| | | | |
|---|---|---|---|
| 2015/0233597 A1* | 8/2015 | Dempster | F24F 11/62 165/218 |
| 2015/0333669 A1* | 11/2015 | Alexander | H02P 6/24 318/599 |
| 2016/0116177 A1 | 4/2016 | Sikora et al. | |

* cited by examiner

SYSTEMS AND METHODS FOR ACTUATOR INSTALLATION AUTO-VERIFICATION

CROSS-REFERENCE TO RELATED PATENT APPLICATION

This application is a continuation of U.S. patent application Ser. No. 15/968,710, filed May 1, 2018, which claims the benefit of and priority to U.S. Provisional Patent Application No. 62/500,353, filed May 2, 2017, all of which are herein incorporated by reference in their entireties and for all purposes.

BACKGROUND

The present disclosure relates generally to the field of building management systems and associated devices. More particularly, the present disclosure relates to an actuator configured to execute an algorithm that detects whether the actuator is properly installed.

SUMMARY

One implementation of the present disclosure is an actuator in an HVAC system. The actuator includes a motor and a drive device. The drive device is driven by the motor and coupled to an HVAC component for driving the HVAC component between multiple positions. The actuator further includes a processing circuit. The processing circuit is coupled to the motor and configured to transmit control signals to operate the motor to drive the HVAC component between a first position and a second position, monitor temperature data received from one or more temperature sensors, determine that the temperature data does not meet an expected performance criterion and transmit an alarm signal.

In some embodiments, the HVAC component is a damper, a valve, a fan, or a pump.

In some embodiments, the alarm signal is configured to illuminate a notification light emitting diode (LED).

In some embodiments, the alarm signal is configured to transmit a message to a building management system (BMS) controller or a building automation system (BAS).

In some embodiments, determining that the temperature data does not meet an expected performance criterion includes determining that a slope of the temperature data is unexpectedly positive or unexpectedly negative. In other embodiments, the processing circuit is further configured to reverse a control logic function in response to a determination that the slope of the temperature data is unexpectedly positive or unexpectedly negative.

In some embodiments, determining that the temperature data does not meet an expected performance criterion includes determining that the temperature data exceeds a low temperature threshold or a high temperature threshold.

In some embodiments, one of the temperature sensors is a supply air temperature sensor.

In some embodiments, one of the temperature sensors is a zone air temperature sensor.

In some embodiments, one of the temperature sensors is an outdoor air temperature sensor.

Another implementation of the present disclosure is a method for controlling an actuator in an HVAC system. The method includes transmitting control signals to operate a motor to drive a HVAC component between a first position and a second position, monitoring temperature data received from one or more temperature sensors, determining that the temperature data does not meet an expected performance criterion, and transmitting an alarm signal.

In some embodiments, the alarm signal is configured to illuminate a notification light emitting diode (LED).

In some embodiments, the alarm signal is configured to transmit a message to a building management system (BMS) controller or a building automation system (BAS).

In some embodiments, one of the temperature sensors is a supply air temperature sensor.

In some embodiments, one of the temperature sensors is a zone air temperature sensor.

In some embodiments, one of the temperature sensors is an outdoor air temperature sensor.

Yet another implementation of the present disclosure is an actuator in an HVAC system. The actuator includes a motor and a drive device. The drive device is driven by the motor and coupled to an HVAC component for driving the HVAC component between multiple positions. The actuator further includes a processing circuit. The processing circuit is coupled to the motor and configured to transmit control signals to operate the motor to drive the HVAC component between a first position and a second position, monitor temperature data received from one or more temperature sensors, determine that a slope of the temperature data exceeds a historical slope threshold, and transmit an alarm signal to a building management system (BMS) controller or a building automation system (BAS).

In some embodiments, the alarm signal is configured to notify a user of a need of actuator cleaning.

In some embodiments, the alarm signal is configured to notify a user of a need of actuator replacement.

In some embodiments, the HVAC component is a damper, a valve, a fan, or a pump.

DETAILED DESCRIPTION

Before turning to the FIGURES, which illustrate the embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, an HVAC actuator with installation auto-verification is shown, according to some embodiments. HVAC actuators are used to operate a wide variety of HVAC components such as air dampers, fluid valves, air handling units, and other components that are typically used in HVAC systems. For example, an actuator can be coupled to a damper, valve, or other movable equipment in a HVAC system and can be used to drive the equipment between an open position and a closed position. An actuator typically includes a motor and a drive device (e.g., a hub, a drive train, etc.) that is driven by the motor and coupled to the HVAC component.

Verifying that an actuator is installed in the correct orientation can be a difficult and time-consuming endeavor. Previous methods of verification require a technician to manually open and close the actuator and monitor the temperature of surrounding zones to ensure the actuator is correctly installed. By contrast, the actuator of the present disclosure is configured to automatically execute a process that verifies that the actuator is in the correct orientation. The process includes modulating the operation of the actuator, communicating with one or more temperature sensors, determining whether temperature data received from the sensors comports with expected performance criteria, and alerting the technician via messages to a controller or notification LEDs if the temperature data is out of expected ranges due to improper installation orientation.

Figure 1:
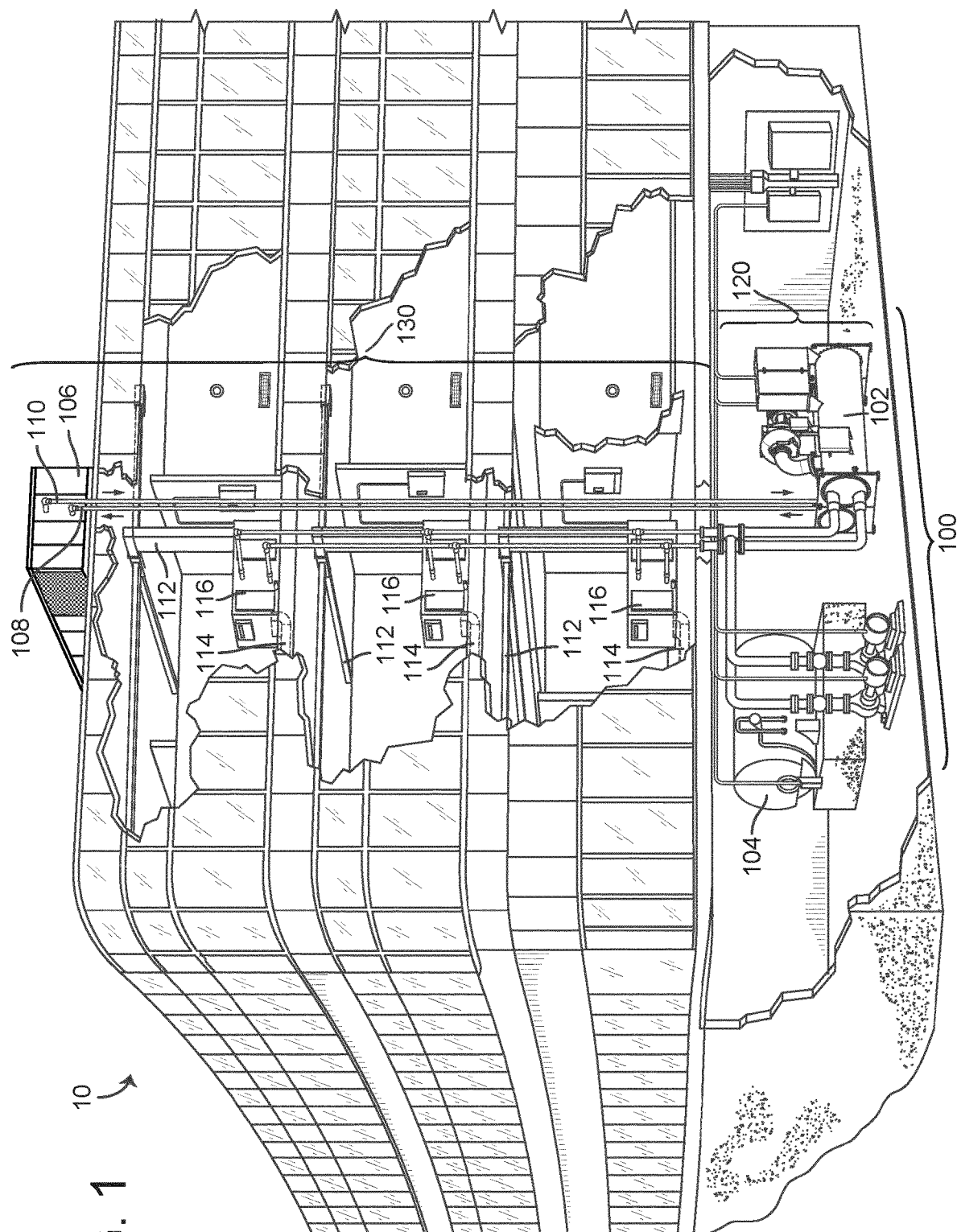
FIG. 1 is a drawing of a building equipped with a heating, ventilating, and air conditioning (HVAC) system, according to some embodiments.
Figure 2:
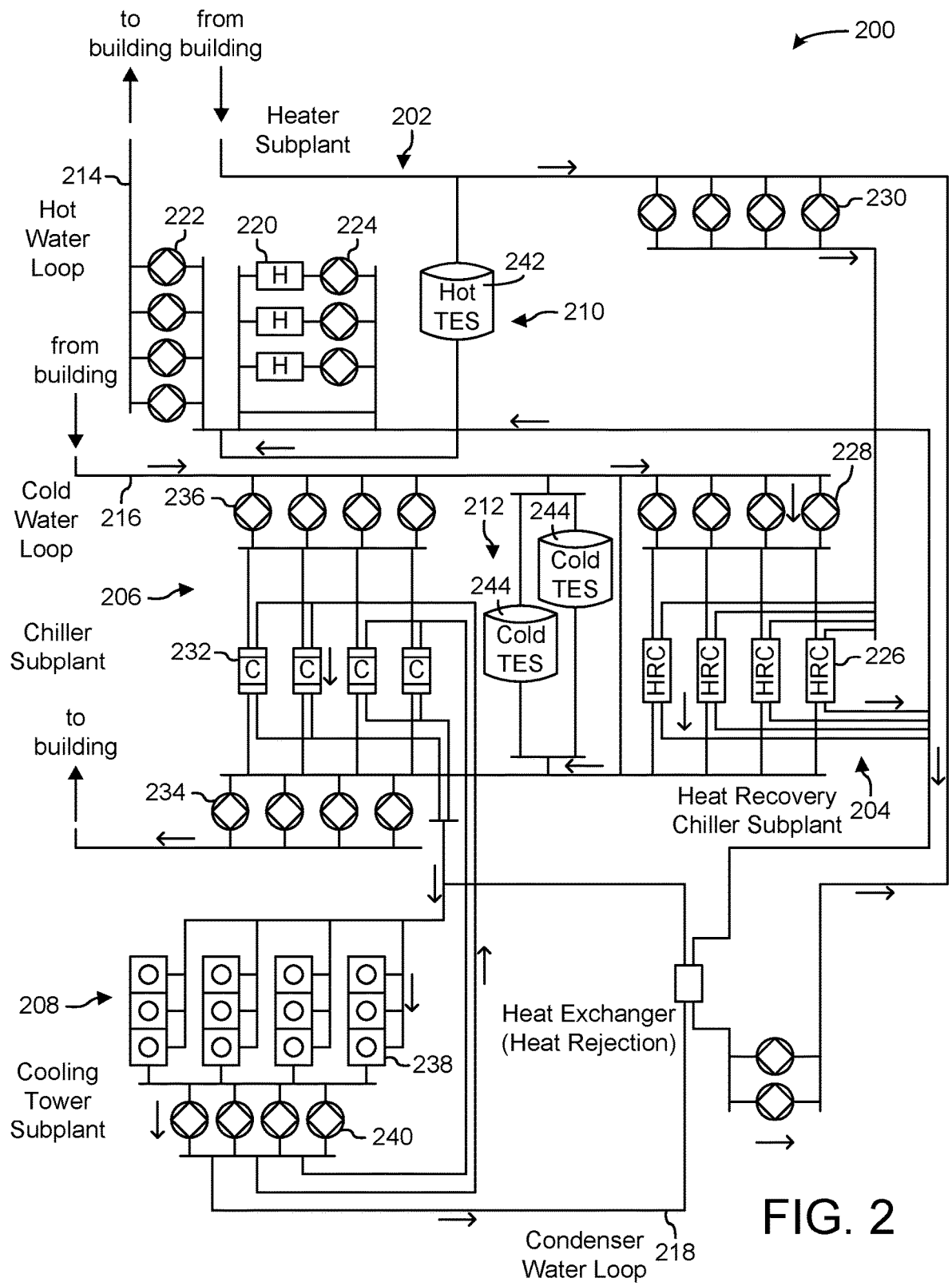
FIG. 2 is a block diagram of a building management system (BMS) which can be used to monitor and control the building and HVAC system of FIG. 1, according to some embodiments.
Figure 3:
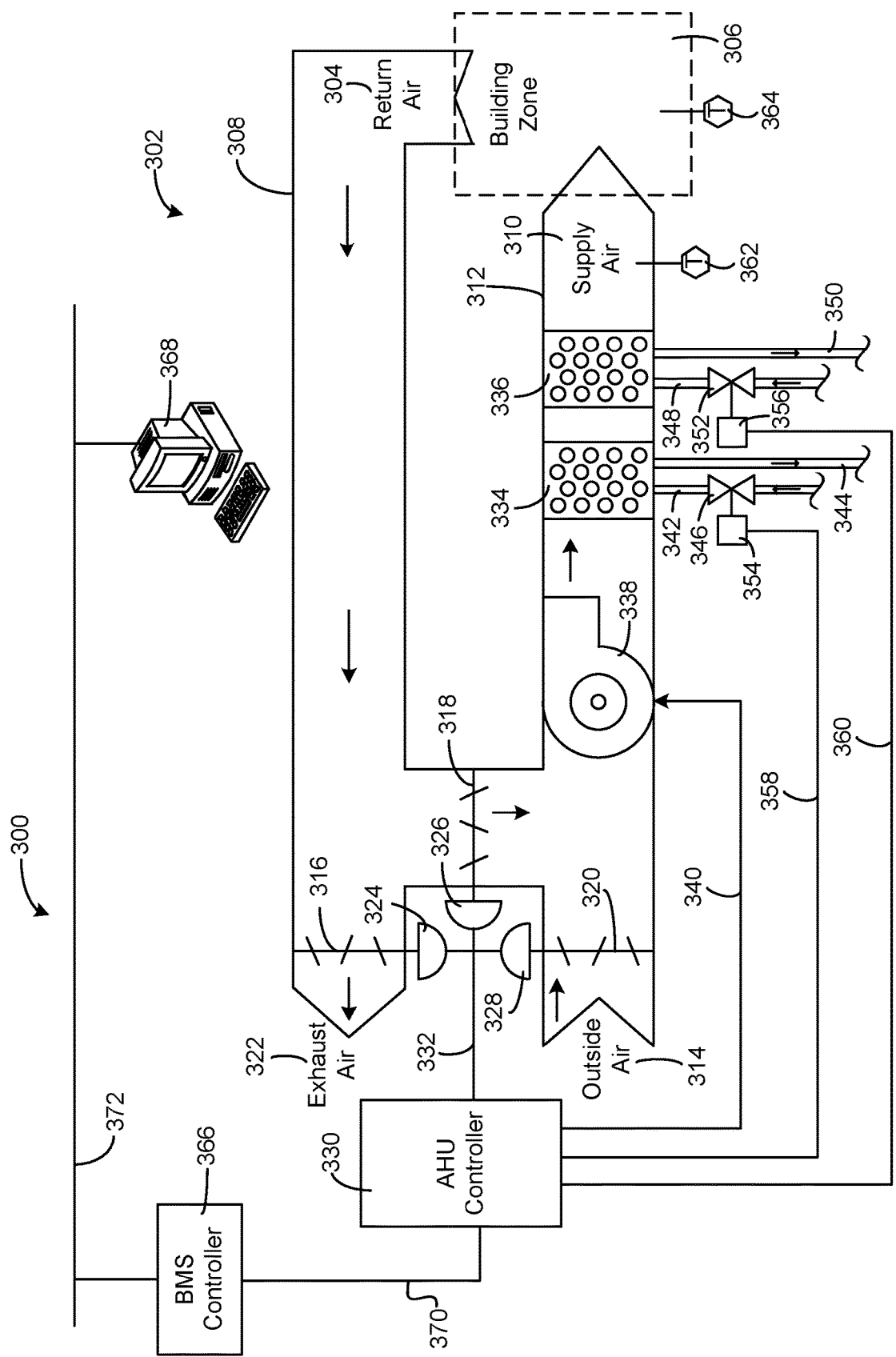
FIG. 3 is a block diagram illustrating the BMS of FIG. 2 in greater detail, according to some embodiments.

Referring now to FIGS. 1-3, an exemplary building management system (BMS) and HVAC system in which the systems and methods of some embodiments can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of some of the embodiments described herein.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
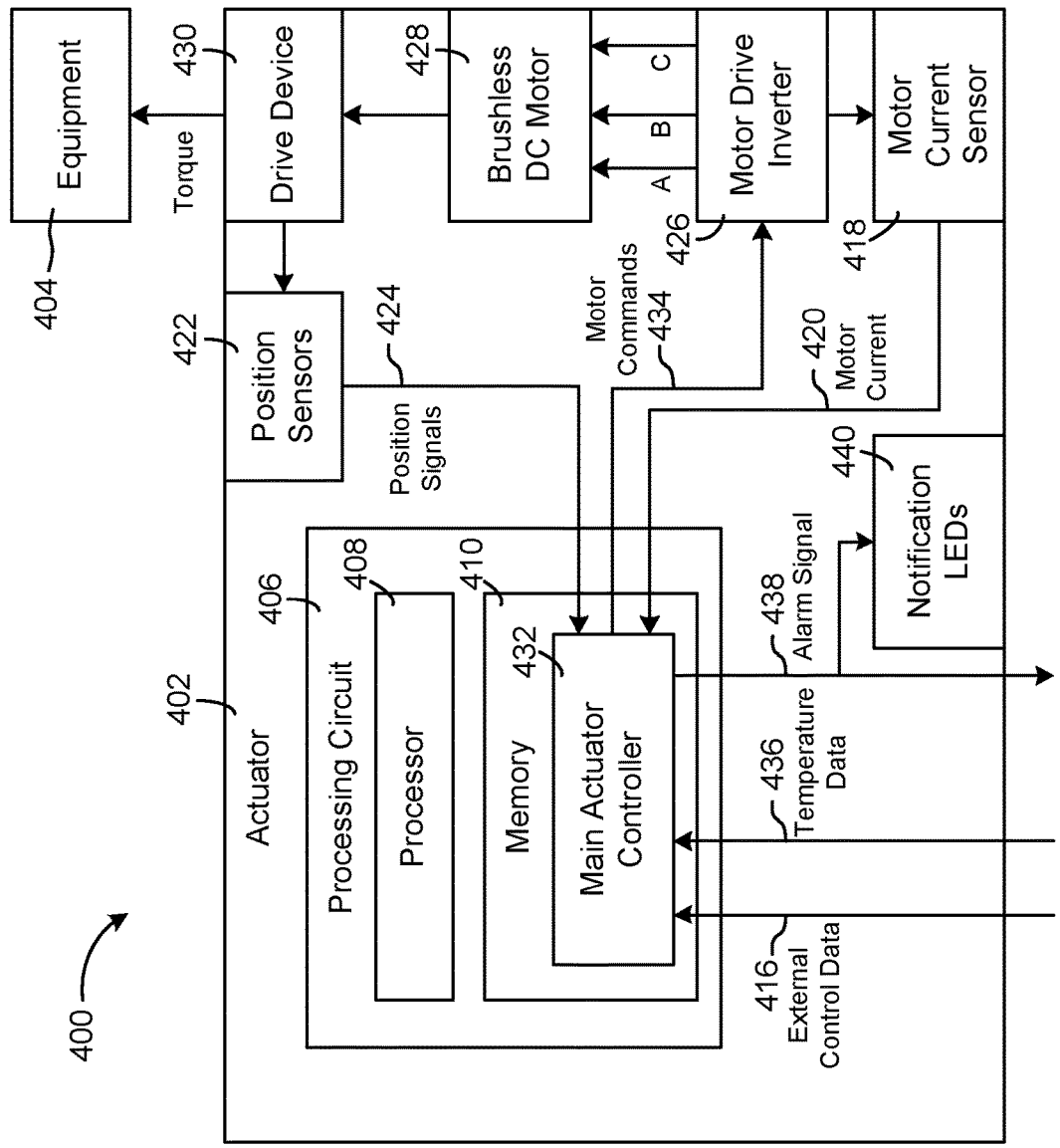
FIG. 4 is a block diagram of an actuator that can be implemented in the HVAC system of FIG. 1, according to some embodiments.

Referring now to FIG. 4, a block diagram of an actuator system 400 is shown, according to some embodiments. Actuator system 400 may be used in HVAC system 100, waterside system 200, or airside system 300 as described with reference to FIGS. 1-3. In some embodiments, actuator 402 is identical or substantially similar to valve actuator 354 or 356, described above with reference to FIG. 3. Actuator 402 may be configured to operate equipment 404. Equipment 404 may include any type of system or device that can be operated by an actuator (e.g., a valve, a damper, a compressor).

Actuator 402 is shown to include a processing circuit 406 communicably coupled to brushless DC (BLDC) motor 428. Processing circuit 406 is shown to include a processor 408, memory 410, and a main actuator controller 432. Processor 408 can be a general purpose or specific purpose processor, an application specific integrated circuit (ASIC), one or more field programmable gate arrays (FPGAs), a group of processing components, or other suitable processing components. Processor 408 can be configured to execute computer code or instructions stored in memory 410 or received from other computer readable media (e.g., CDROM, network storage, a remote server, etc.).

Memory 410 may include one or more devices (e.g., memory units, memory devices, storage devices, etc.) for storing data and/or computer code for completing and/or facilitating the various processes described in the present disclosure. Memory 410 may include random access memory (RAM), read-only memory (ROM), hard drive storage, temporary storage, non-volatile memory, flash memory, optical memory, or any other suitable memory for storing software objects and/or computer instructions. Memory 410 may include database components, object code components, script components, or any other type of information structure for supporting the various activities and information structures described in the present disclosure. Memory 410 can be communicably connected to processor 408 via processing circuit 406 and may include computer code for executing (e.g., by processor 408) one or more processes described herein. When processor 408 executes instructions stored in memory 410, processor 408 generally configures actuator 402 (and more particularly processing circuit 406) to complete such activities.

Main actuator controller 432 may be configured to receive various types of data, including: external control data 416 (e.g., position setpoints, speed setpoints), temperature data 436 (supply air temperature data, zone temperature data), and position signals 424 from position sensors 422. Main actuator controller 432 may be configured to determine the position of BLDC motor 428 and/or drive device 430 based on position signals 424. In some embodiments, main actuator controller 432 receives data from additional sources. For example, motor current sensor 418 may be configured to measure the electric current provided to BLDC motor 428. Motor current sensor 418 may generate a feedback signal indicating the motor current 420 and may provide this signal to main actuator controller 432 within processing circuit 408.

Still referring to FIG. 4, processing circuit 408 may be configured to output a pulse width modulated (PWM) DC motor command 434 to control the speed of the BLDC motor. BLDC motor 428 may be configured to receive a three-phase PWM voltage output (e.g., phase A, phase B, phase C) from motor drive inverter 426. The duty cycle of the PWM voltage output may define the rotational speed of BLDC motor 428 and may be determined by processing circuit 406 (e.g., a microcontroller). Processing circuit 406 may increase the duty cycle of the PWM voltage output to increase the speed of BLDC motor 428 and may decrease the duty cycle of the PWM voltage output to decrease the speed of BLDC motor 428.

BLDC motor 428 may be coupled to drive device 430. Drive device 430 may be a drive mechanism, a hub, or other device configured to drive or effectuate movement of a HVAC system component (e.g., equipment 404). For example, drive device may be configured to receive a shaft of a damper, a valve, or any other movable HVAC system component in order to drive (e.g., rotate) the shaft. In some embodiments, actuator 402 includes a coupling device configured to aid in coupling drive device 430 to the movable HVAC system component. For example, the coupling device may facilitate attaching drive device 430 to a valve or damper shaft.

Position sensors 422 may include Hall effect sensors, potentiometers, optical sensors, or other types of sensors configured to measure the rotational position of BLDC motor 428 and/or drive device 430. Position sensors 422 may provide position signals 424 to processing circuit 406. Main actuator controller 432 may use position signals 424 to determine whether to operate BLDC motor 428. For example, main actuator controller 432 may compare the current position of drive device 430 with a position setpoint received via external data input 416 and may operate BLDC motor 428 to achieve the position setpoint.

In some embodiments, external data 416 is a DC voltage control signal. Actuator 402 can be a linear proportional actuator configured to control the position of drive device 430 according to the value of the DC voltage received. For example, a minimum input voltage (e.g., 0.0 VDC) may correspond to a minimum rotational position of drive device 430 (e.g., 0 degrees, −5 degrees, etc.), whereas a maximum input voltage (e.g., 10.0 VDC) may correspond to a maximum rotational position of drive device 430 (e.g., 90 degrees, 95 degrees, etc.). Input voltages between the minimum and maximum input voltages may cause actuator 402 to move drive device 430 into an intermediate position between the minimum rotational position and the maximum rotational position. In other embodiments, actuator 402 can be a non-linear actuator or may use different input voltage ranges or a different type of input control signal (e.g., AC voltage or current) to control the position and/or rotational speed of drive device 430.

In some embodiments, external data 416 is an AC voltage control signal having a standard power line voltage (e.g., 120 VAC or 230 VAC at 50/60 Hz). The frequency of the voltage signal can be modulated (e.g., by main actuator controller 432) to adjust the rotational position and/or speed of drive device 430. In some embodiments, actuator 402 uses the voltage signal to power various components of actuator 402. Actuator 402 may use the AC voltage signal as a control signal, a source of electric power, or both. In some embodiments, the voltage signal is received from a power supply line that provides actuator 402 with an AC voltage having a constant or substantially constant frequency (e.g., 120 VAC or 230 VAC at 50 Hz or 60 Hz).

As described above, main actuator controller 432 may receive temperature data signals 436 from one or more temperature sensors. In some embodiments, the temperature sensor is a supply air temperature sensor (e.g., temperature sensor 362) located immediately downstream of the heating and/or cooling coils (e.g., coils 334-336) controlled by actuator 402. In other embodiments, the temperature sensor is a zone air temperature sensor (e.g., temperature sensor 364) located in a building zone (e.g., zone 306). In still further embodiments, the temperature sensor may be located in outdoor air. Main actuator controller 432 may also receive data signals from other types of sensors. For example, if the actuator system 400 is installed in a waterside system (e.g., waterside system 200), main actuator controller 432 may receive data from flow sensors, as well as temperature sensors.

Main actuator controller 432 may be configured to run an algorithm that determines whether the actuator is installed correctly based at least in part on data received from temperature data signals 436. For example, if the main controller 432 expects to be operating in a cooling mode and upon operating equipment 404 (e.g., opening a valve) driven by actuator 404 the temperature data signals 436 indicate an increase in temperature, rather than a decrease, main controller 432 may be configured to send an alarm signal 438 to a technician. In some embodiments, alarm signal 438 may send a message to a BMS controller (e.g., BMS controller 366) or a building automation system (BAS). Alarm signal 438 may also be configured to illuminate notification light emitting diodes (LEDs) 440. Notification LEDs 440 may be located on the exterior of the actuator 404 and visible to a technician. For example, if main actuator controller 432 transmits alarm signal 438, notification LEDs 440 may be illuminated in red or amber, indicating the detected problem. In some embodiments, main actuator controller 432 may be configured to modify a control logic function in response to a determination that the actuator is installed incorrectly. For example, the main actuator controller 432 may drive the motor 428 in the opposite direction to compensate for the incorrect installation. However, in other embodiments, (e.g., when the actuator 402 is configured to fail safe to either an open position or a closed position) the main actuator controller 432 does not modify control logic functions in response to a determination that the actuator is installed in an incorrect orientation.

Main actuator controller 432 may be configured to detect irregularities in the installation of actuator 402 via several methods of analyzing temperature data signals 436. In some embodiments, as described above, main actuator controller 432 may detect that the slope of the temperature data signals is unexpectedly positive or negative (i.e., indicating heating when cooling is expected, or cooling when heating is expected). In other embodiments, main actuator controller 432 analyzes the temperature data based on the value of the slope, whether the change in temperature data exceeds a setpoint threshold of degrees, or whether the temperature data exceeds a high or low temperature threshold. In some embodiments, main actuator controller 432 dynamically selects a method of analyzing the temperature data signals 436 based on the type (e.g., supply air temperature data, zone temperature data) and/or number of data signals received. In other embodiments, main actuator controller 432 may compare temperature data signals 436 with historical data to detect the need for service or replacement of components within HVAC system 100. For example, if the main actuator controller 432 determines that the slope of the temperature data signals 436 is unacceptably smaller than the slope of historical temperature data based on a configurable threshold (i.e., the system is responding much more slowly than it used to), main actuator controller 432 may transmit an alarm signal 438 to a BMS controller or BAS. The BMS controller or BAS may display a message notifying a technician of the need for cleaning, service, or replacement of components in the HVAC system 100.

Figure 5:
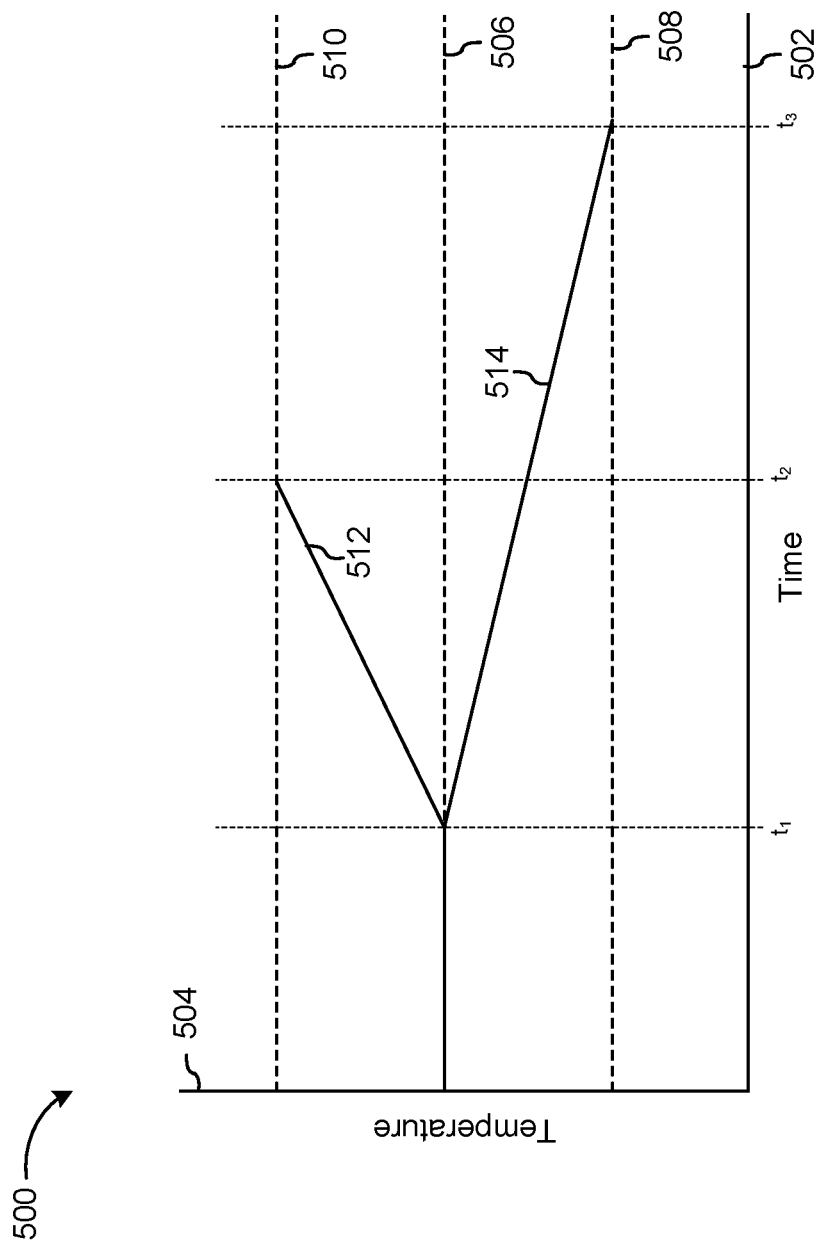
FIG. 5 is a graph of temperature data that can be utilized by the actuator controller of FIG. 4, according to some embodiments.

Referring now to FIG. 5, a graph 500 of temperature data that can be utilized by the main actuator controller 432 of actuator 402 is shown, according to some embodiments. As shown, graph 500 includes temperature data signals 512 and 514 plotted on a horizontal time axis 502 and a vertical temperature axis 504. In some embodiments, data signal 512 may be representative of the data from a supply air temperature sensor (e.g., temperature sensor 362), while data signal 514 may be representative of the data from a zone air temperature sensor (e.g., temperature sensor 364). Initial temperature 506 may represent the supply or zone air temperature value prior to operation of the actuator 402. Low temperature threshold 508 and high temperature threshold 510 may represent performance boundaries configured to trigger main actuator controller 432 to transmit alarm signal 438 when exceeded by data signals 512 or 514. In other embodiments, main actuator controller 432 may transmit an alarm signal 438 if the value and/or sign (i.e., positive or negative) of the slopes of data signals 512-514 do not meet expected values.

At time $t_1$, main actuator controller 432 may send a motor control signal 434 to command the motor 428 and drive device 430 to operate the coupled HVAC component (e.g., a valve, a damper). For example, drive device 430 may begin to drive a valve from a closed position to an open position. As shown, supply air temperature data signal 512 indicates increasing supply air temperature, while signal 514 indicates decreasing zone air temperature. The slope of supply air temperature data signal 512 may be larger than the slope of zone air temperature data signal 514 because the zone air temperature is slower to respond to a change in condition caused by actuator 402. At time $t_2$, supply air temperature data signal 512 exceeds the high temperature threshold 510. At time $t_3$, zone air temperature data signal 514 exceeds the low temperature threshold 508. In various embodiments, depending on the analysis method selected by main actuator controller 432, main actuator controller 432 may transmit an alarm signal between times $t_1$ and $t_2$ if main actuator controller 432 determines that slope of signal 512 is positive when it is expected to be negative, or at time $t_2$ when signal 512 exceeds high temperature threshold 510. In addition, main actuator controller 432 may transmit an alarm signal between times $t_1$ and $t_3$ if main actuator controller 432 determines that slope of signal 514 is negative when it is expected to be positive, or at time $t_3$ when signal 514 exceeds low temperature threshold 508.

Figure 6:
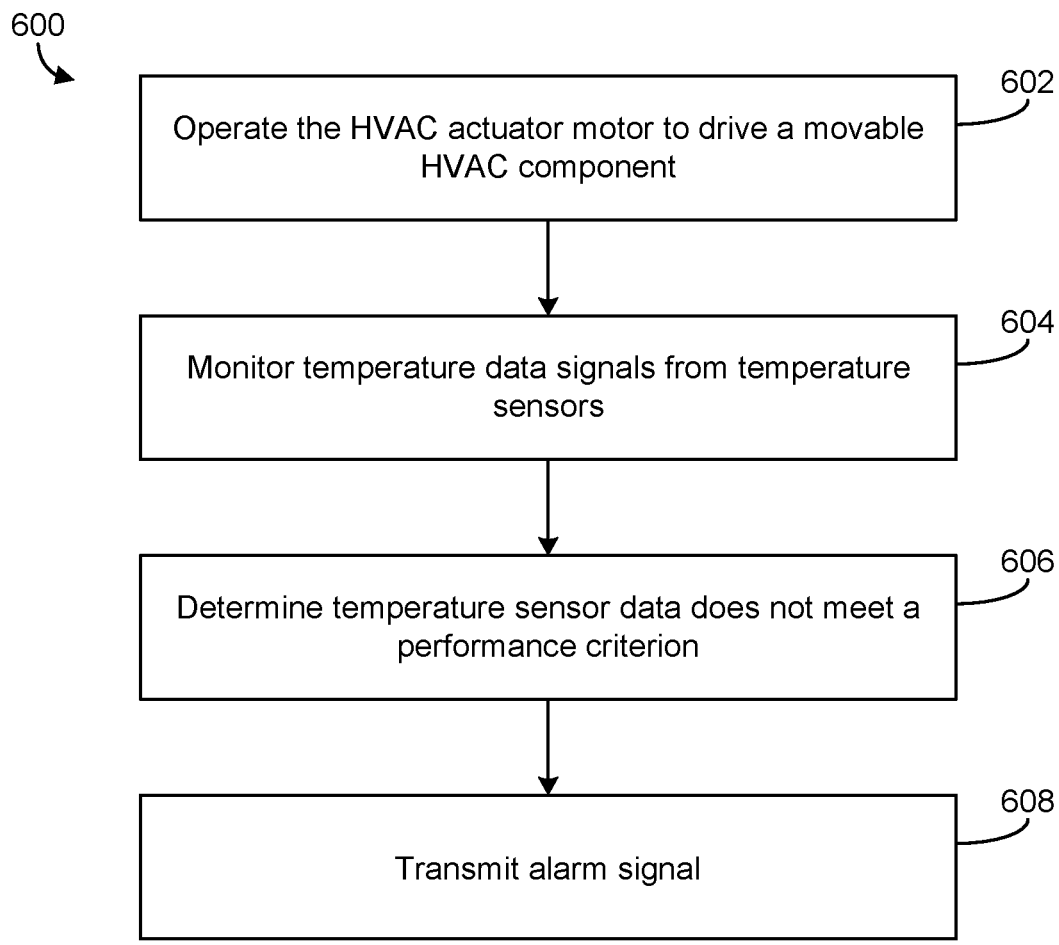
FIG. 6 is a flow diagram of a method of determining whether the actuator of FIG. 4 is installed in the correct orientation, according to some embodiments.

Turning now to FIG. 6, a flowchart of a process 600 for determining whether an actuator is installed in the correct orientation is shown, according to some embodiments. Process 600 may be performed by main actuator controller 432 of actuator 402, described above with reference to FIG. 4. In various embodiments, actuator 402 may be a damper actuator, a valve actuator, a fan actuator, a pump actuator, or any other type of actuator that can be used in a HVAC system or BMS. The actuator may be a linear actuator (e.g., a linear proportional actuator), a non-linear actuator, a spring return actuator, or a non-spring return actuator.

Process 600 may begin with step 602, in which main actuator controller 432 sends a motor control signal 434 to command the motor 428 to drive the coupled equipment 404 between positions (e.g., from a fully closed position to a fully open position). As coupled equipment 404 moves to the open position, main actuator controller 432 monitors temperature data signals 436 received from one or more temperature sensors. Continuing with step 606, main actuator controller 432 may determine that the temperature data signals 436 are transmitting temperature data that is out of an expected performance range. As described above, the expected performance criteria of the temperature data may be based on the slope of the data, or certain thresholds. In response to detecting data that does not meet an expected performance criterion, process 600 may conclude with step 608, in which main actuator controller 432 transmits an alarm signal 438. In some embodiments, alarm signal 438 is transmitted to a BMS controller or BAS to trigger an error message for a technician. In other embodiments, alarm signal 438 illuminates notification LEDs on the actuator 402.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An actuator in an HVAC system configured to modify an environmental condition of a building, the actuator comprising:
   a motor;
   a drive device driven by the motor and coupled to an HVAC component for driving the HVAC component between multiple positions; and
   a processing circuit coupled to the motor and configured to:
      transmit control signals to operate the motor to drive the HVAC component between a first position and a second position;
      monitor temperature data received from one or more temperature sensors; and
      modify a control logic function of the actuator for at least one of the motor or the drive device in response to the monitored temperature data, wherein modifying the control logic function comprises modulating the actuator using a different control logic function in response to a determination that temperature data is at least one of unexpectedly positive or unexpectedly negative.

2. The actuator of claim 1, wherein the HVAC component is at least one of a damper, a valve, a fan, or a pump.

3. The actuator of claim 1, wherein the processing circuit is further configured to transmit an alarm signal based on the determining that the temperature data does not meet an expected performance criterion, wherein the alarm signal is configured to illuminate at least one notification light emitting diode (LED).

4. The actuator of claim 1, wherein the processing circuit is further configured to transmit an alarm signal based on the determining that the temperature data does not meet an expected performance criterion, wherein the alarm signal is configured to transmit a message to at least one of a building management system (BMS) controller or a building automation system (BAS).

5. The actuator of claim 1, wherein determining that the temperature data does not meet an expected performance criterion comprises determining that a slope of the temperature data is at least one of the unexpectedly positive or the unexpectedly negative.

6. The actuator of claim 5, wherein modulating the actuator using a different control logic function comprises reversing the control logic function in response to a determination that the slope of the temperature data is at least one of the unexpectedly positive or the unexpectedly negative.

7. The actuator of claim 1, wherein determining that the temperature data does not meet an expected performance criterion comprises determining that the temperature data exceeds at least one of a low temperature threshold or a high temperature threshold.

8. The actuator of claim 1, wherein the one or more temperature sensors comprises a supply air temperature sensor.

9. The actuator of claim 1, wherein the one or more temperature sensors comprises a zone air temperature sensor.

10. The actuator of claim 1, wherein the one or more temperature sensors comprises an outdoor air temperature sensor.

11. A method for operating an actuator in an HVAC system, the method comprising:
    transmitting, by a processing circuit of the actuator, control signals to operate a motor coupled to a drive device configured to drive an HVAC component between a first position and a second position, wherein the actuator, including the motor, drive device, and processing circuit, is configured to be physically coupled to the HVAC component via the drive device;
    monitoring, by the processing circuit, temperature data received from one or more temperature sensors; and
    modifying, by the processing circuit, a control logic function of the actuator for at least one of the motor or the drive device in response to the monitored temperature data, wherein modifying the control logic function comprises modulating the actuator using a different control logic function in response to a determination that the temperature data is at least one of unexpectedly positive or unexpectedly negative.

12. The method of claim 11, wherein an alarm signal is configured to illuminate at least one notification light emitting diode (LED).

13. The method of claim 11, wherein an alarm signal is configured to transmit a message to at least one of a building management system (BMS) controller or a building automation system (BAS).

14. The method of claim 11, wherein at least one of the temperature sensors is a supply air temperature sensor.

15. The method of claim 11, wherein at least one of the temperature sensors is a zone air temperature sensor.

16. The method of claim 11, wherein at least one of the temperature sensors is an outdoor air temperature sensor.

17. An actuator in an HVAC system configured to modify an environmental condition of a building, the actuator comprising:
    a motor;

a drive device driven by the motor and coupled to an HVAC component for driving the HVAC component between multiple positions; and a processing circuit coupled to the motor and configured to:

transmit control signals to operate the motor to drive the HVAC component between a first position and a second position; monitor temperature data received from one or more temperature sensors; and modify a control logic function of the actuator for at least one of the motor or the drive device in response to the monitored temperature data, wherein modifying the control logic function comprises modulating the actuator using a different control logic function in response to a determination that temperature data is at least one of unexpectedly positive or unexpectedly negative.

18. The actuator of claim 17, wherein an alarm signal is configured to notify a user of a need of actuator cleaning.

19. The actuator of claim 17, wherein an alarm signal is configured to notify a user of a need of actuator replacement.

20. The actuator of claim 17, wherein the HVAC component is at least one of a damper, a valve, a fan, or a pump.

* * * * *